United States Patent [19]

Buchert et al.

[11] Patent Number: 4,981,895

[45] Date of Patent: Jan. 1, 1991

[54] HEAT-RESISTANT THERMOPLASTIC MOLDING COMPOSITIONS

[75] Inventors: Hermann Buchert, Bad Durkheim; Gerhard Heinz, Weisenheim, both of Fed. Rep. of Germany; Peter Ittemann, Fort Mill, S.C.; Michael Kopietz, Gruenstadt, Fed. Rep. of Germany; Juergen Koch, Neuhofen, Fed. Rep. of Germany; Wolfgang Eberle, Mainz, Fed. Rep. of Germany; Hartmut Zeiner, Ludwigshafen, Fed. Rep. of Germany

[73] Assignee: BASF Aktiengesellschaft, Ludwigshafen, Fed. Rep. of Germany

[21] Appl. No.: 394,970

[22] Filed: Aug. 17, 1989

[30] Foreign Application Priority Data

Sep. 1, 1988 [DE] Fed. Rep. of Germany ....... 3829712

[51] Int. Cl.$^5$ .............................................. C08K 3/38
[52] U.S. Cl. .................... 524/405; 524/408; 524/409; 524/417; 524/450; 524/492; 524/493; 524/495; 524/437
[58] Field of Search ............... 524/405, 408, 409, 410, 524/417, 450, 492, 493, 495, 437

[56] References Cited

U.S. PATENT DOCUMENTS

| | | | |
|---|---|---|---|
| 3,321,435 | 5/1967 | Fritz et al. | 524/405 |
| 3,468,844 | 9/1969 | Merrian et al. | 260/45.75 |
| 3,560,441 | 2/1971 | Schwarcz et al. | 524/405 |
| 3,794,615 | 2/1974 | Beverly | 524/417 |
| 3,816,307 | 6/1974 | Woods | 524/405 |
| 3,832,322 | 8/1974 | Critchley | 524/409 |
| 3,894,983 | 7/1975 | Higbee | 524/450 |
| 3,925,307 | 12/1975 | Dahl et al. | 524/408 |
| 4,130,538 | 12/1978 | Shutt | 260/40 |
| 4,212,793 | 7/1980 | Shue | 524/405 |
| 4,403,061 | 9/1983 | Brooks et al. | 524/405 |
| 4,593,061 | 6/1986 | Vogdes et al. | 524/417 |
| 4,639,486 | 1/1987 | Liu | 524/409 |
| 4,668,719 | 5/1987 | Kato et al. | 524/410 |
| 4,713,407 | 12/1987 | Bailey et al. | 524/109 |
| 4,843,113 | 6/1989 | Tatsukami et al. | 524/425 |

FOREIGN PATENT DOCUMENTS

| | | |
|---|---|---|
| 4634 | 10/1979 | European Pat. Off. . |
| 167009 | 1/1986 | European Pat. Off. . |
| 251649 | 1/1988 | European Pat. Off. . |
| 296877 | 12/1988 | European Pat. Off. . |
| 62-295956 | 12/1987 | Japan . |

OTHER PUBLICATIONS

A. H. Frazer: High Temperature Resistant Polymers, pp. 1, 2, 32, 33 and Table of Contents XI to XIV.

*Primary Examiner*—Veronica P. Hoke
*Attorney, Agent, or Firm*—Oblon, Spivak, McClelland, Maier & Neustadt

[57] ABSTRACT

Thermoplastic molding compositions suitable for producing interior components for vehicles for the conveyance of passengers, in particular aircraft, which show a low smoke gas density and low heat release characteristics in the event of a fire, are based on a heat-resistant plastic which contains as a filler from 0.5 to 50% by weight of an oxide of an element of main group III, IV or V, of a salt of an oxygen acid of an element of main group III, IV or V or of a compound which on heating forms such an oxide or salt.

3 Claims, No Drawings

HEAT-RESISTANT THERMOPLASTIC MOLDING COMPOSITIONS

The present invention relates to heat-resistant thermoplastic molding compositions of low heat release in the event of fire which are suitable for producing interior components for vehicles for the conveyance of passengers, in particular aircraft.

The insides of aircraft are constructed with the use of moldings made of thermoplastics. Hitherto, ABS polymers, polyvinyl chloride or polycarbonates have been used for this purpose. However, in the event of a fire these materials release a lot of heat, toxic gases and smoke of high optical density in particular in the critical first 5 minutes after the fire has started. Plastics which are resistant at high temperatures, for example polyether sulfones, do not have this disadvantage; in the event of a fire their smoke gas density is low and they form only small amounts of toxic gases. They meet the Airbus Technical Specification ATS/1000.001. On the other hand, they do not quite meet the tougher standards for heat release in the event of a fire. These have recently been laid down by the Federal Aviation Administration (FAA). For 1988 they provide that the values for heat release (HR) and heat release rate (HRR) (measured by the FAA's FAR test no. 25 853 of Feb. 20, 1987) must be below 100 kW·min·m$^{-2}$ and below 100 kW·m$^{-2}$ respectively; from 1990 the values should be less than 65 kW·min·m$^{-2}$ and less than 65 kW·m$^{-2}$ respectively.

It is an object of the present invention to provide thermoplastic molding compositions which in the event of a fire have a low smoke gas density, release small amounts of toxic combustion gases and meet the FAA's tightened-up conditions concerning heat release.

We have found that this object is achieved by adding certain oxides or salts of elements of main groups III to V to aromatic thermoplastics which are resistant at high temperatures.

The present invention accordingly provides a thermoplastic molding composition containing A. 100 parts by weight of a heat-resistant aromatic thermoplastic having a sustained use temperature of above 130° C. and B. from 0.5 to 50 parts by weight (a) of an oxide of an element of main group III, IV or V, or (b) of a salt of an oxygen acid of an element of main group III, IV or V, each with a melting point of from 300° C. to 1400° C., or (c) of a compound which on heating forms an oxide (a) or a salt (b).

Suitable heat-resistant plastics A are those having a sustained use temperature (as defined in UL 746 B) of above 130° C., preferably of above 150° C. Preference is given to polyether sulfones, in particular those of the structures:

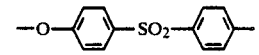

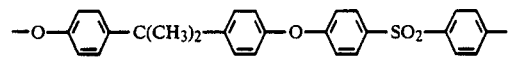

polyether ketones, in particular those of the structures:

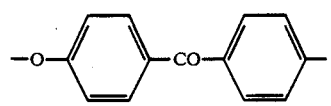

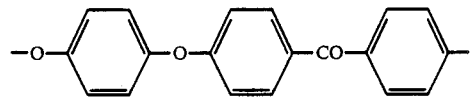

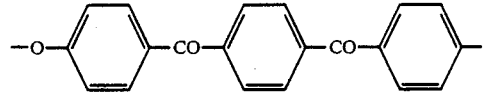

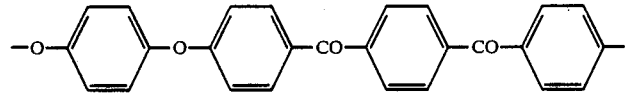

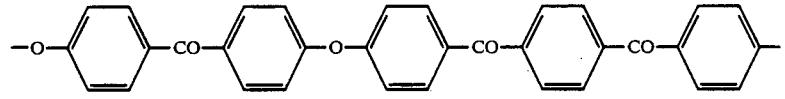

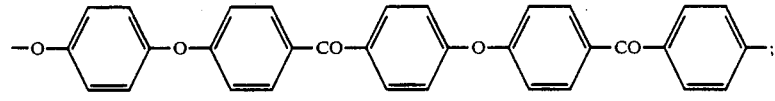

polyether imides of the structure

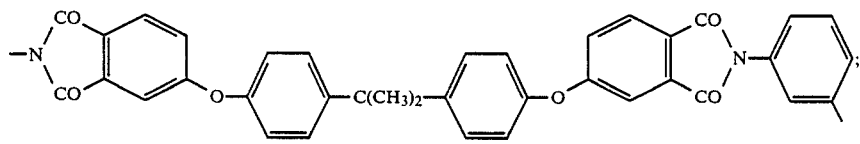

polyphenylene sulfide of the structure

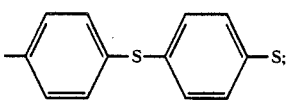

liquid-crystalline polyesters, in particular those based on terephthalic acid, hydroquinone and p-hydroxybenzoic acid:

thermoplastic polyimides of the structure

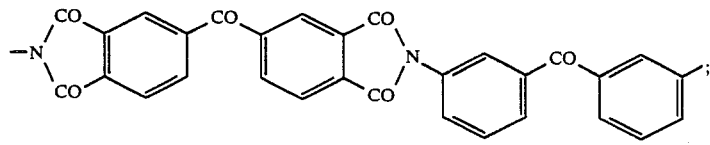

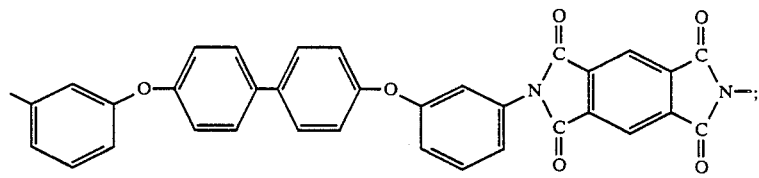

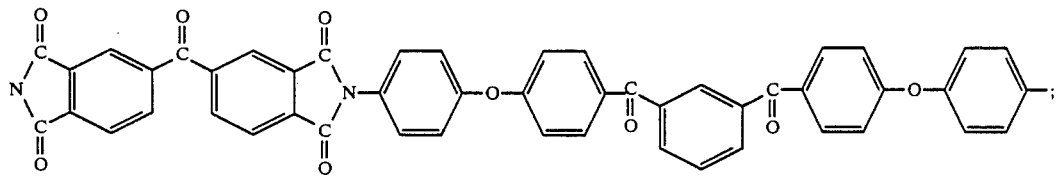

thermoplastic polyamide imides of the structure

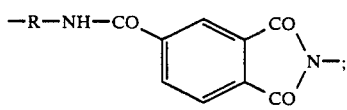

and corresponding random and block copolymers and mixtures of two or more of these polymers.

These polymers contain according to the invention from 0.5 to 50 parts by weight, preferably from 0.5 to 20 parts by weight and in particular from. 1 to 5 parts by weight, of a filler B which inhibits the release of heat in the event of a fire. Particular preference is given to those inorganic fillers which on cooling turn from a molten state into an amorphous, glassy state, forming a two- or three-dimensional network structure which can wet the molten polymer and cover it with a layer of melt. Filler B can preferably be strongly absorptive or reflective of IR radiation. It is possible to use oxides of elements of main groups III to V of the periodic table and salts, preferably Na—, K—, Ca—, Zn—or Al—salts, of oxygen acids of an element of main group III, IV, or V, provided they have a melting point of 300° C. to 1400° C., preferably of 350° C. to 1200° C., in particular from 400° C. to 1000° C., and of compounds, for example hydrates or carbonates, which in the event of a fire (for example at from about 500° C.) form such an oxide or salt. It is also possible to produce mixtures of the types of substances mentioned.

Suitable fillers are for example:

$B_2O_3$, $NaBO_2$, $KB_5P_8$, $Na_2B_4O_7$, $Ca(BO_2)_2$, $Zn(BO_2)_2$; $Zn_2B_6O_{11}$, $P_2O_5$, $NaPO_3$, $Na_4P_2O_7$; $Ca(PO_3)_2$, $Zn_3(PO_4)_2$; $K_3(ArO_3)_3$, $Sb_2O_3$, $Sb_2O_5$, $Na_3SbO_4$; $NaSiO_3$ (water glass), $Na_2O \cdot CaO \cdot 6\ SiO_2$, $K_2O \cdot Al_2O_3 \cdot 6\ SiO_2$ (feld spar), $Na_2O \cdot Al_2O_3 \cdot 6\ SiO_2$ (zeolite) and other silicates.

In addition to these fillers, which prevent heat release in the event of a fire, the molding compositions may contain other, customary additives, for example glass fibers, carbon fibers, pigments, mineral reinforcing agents, toughness modifiers, for example siloxanes, fluoroelastomers, polyphosphogenes, stabilizers and lubricants. The fibrous additives may be used as unidirectional laid fabrics, as woven fabrics, as knitted fabrics or as nonwovens.

The fillers and any further additives are incorporated in a conventional manner. Preferably, the fillers are used in the form of finely ground powders and are for example mixed with the plastic in an extruder. However, it is also possible to incorporate solutions or suspensions of the salts.

In the case of $B_2O_3$, a master batch can be prepared from filler and polymer melt.

The molding compositions according to the invention are suitable in particular for producing interior components of vehicles for the conveyance of passengers, for example films, coverings, injection moldings, sheets or composites, for example with foams. Besides aircraft interior components, the molding compositions are also suitable for components for high speed trains, coaches or subway trains.

The moldings are produced in a conventional manner by extrusion, deep drawing, injection molding, laminating, welding or adhesive bonding. The moldings can be coated with lacquers or covered with dirt-repellent films. Extruded sheets can be covered by coextrusion with a layer which contains the oxides or salts in a high concentration. They are notable for low HR or HRR values of less than 65, preferably less than 60, kW·min·m$^{-2}$ or kW·m$^{-2}$.

In the Examples, the percentages are by weight. Incorporation is by compounding of finely pulverulent filler into the respective thermoplastic on an extruder.

Heat release was measured on 2-mm thick sheets in terms of HR (kW·min·m$^{-2}$) and HRR (kW·m$^{-2}$); the tables show averages of 4 measurements.

EXAMPLE 1

Filler: $Sb_2O_3$; thermoplastic: polyether sulfone ULTRASON® E 1000 from BASF; incorporation temperature: 370° C.

| % of $Sb_2O_3$ | HR | HRR |
| --- | --- | --- |
| 0 | 30 | 68 |
| 1 | 14 | 64 |
| 3 | 10 | 59 |
| 5 | 3 | 53 |

EXAMPLE 2

Filler: $Zn_2B_6O_{11}$; thermoplastic: polysulfone ULTRASON® E; incorporation temperature: 370° C.

| % of $Zn_2B_6O_{11}$ | HR | HRR |
| --- | --- | --- |
| 0 | 30 | 68 |
| 1 | 8 | 57 |
| 3 | 7 | 48 |
| 5 | 6 | 45 |

EXAMPLE 3

The HRR and HR values of filled and unfilled polyether sulfone ULTRASON® E 2000 white 20126 were measured on 2-mm thick sheets; incorporation temperature: 370° C.

| % of filler | HRR kWm$^{-2}$ | HR kW min m$^{-2}$ |
| --- | --- | --- |
| 0 | 66 | 22 |
| 5% of $Sb_2O_5$ | 49 | 24 |
| 3% of $B_2O_3$ | 56 | 9 |
| 5% of $B_2O_3$ | 50 | 3 |
| 4% of Ca phosphate | 58 | 2 |
| 4% of Ca silicate | 57 | 0 |
| 4% of K pentaborate | 62 | 29 |

EXAMPLE 4

| | HRR and HR values of thermoplastics filled with zinc borate | | | | |
| --- | --- | --- | --- | --- | --- |
| Thermoplastic | $Zn_2B_6O_{11}$ % | Incorporation temp. °C. | Sheet thickness mm | HRR kW·m$^{-2}$ | HR kW·min·m$^{-2}$ |
| ULTEM® 1000 | 1 | 350 | 2.2 | 50 | 10 |
| " | 3 | 350 | 2.2 | 49 | 3 |
| " | 5 | 350 | 2.2 | 46 | 3 |
| ULTRAPEK® KR 4177 | — | 390 | 2.3 | 69 | 0 |
| " | 4 | 390 | 2.3 | 49 | 0 |
| RYTON® P 4 | — | 320 | 2.1 | 78 | 7 |
| " | 4 | 320 | 2.1 | 64 | 4 |

ULTEM® 1000 is a polyether imide from General Electric
ULTRAPEK® is a polyether ketone from BASF
RYTON® is a polyphenylene sulfide from Phillips

We claim:
1. A molding composition characterized by a low heat release factor on burning which comprises consisting essentially of:
   (A) 100 parts by weight of a polyether sulfone or polyether ketone, a corresponding copolymer or a mixture thereof, having a sustained use temperature of above 130° C. and
   (B) from 0.5 to 50 parts by weight
      (a) of an oxide of boron or
      (b) of a salt of an oxygen acid of boron, each with a melting point of from 300° C. to 1400° C., or
      (c) of a compound which on heating forms an oxide (a) or a salt (b).

2. A thermoplastic molding composition as claimed in claim 1, wherein component B is selected from the following compounds: $B_2O_3$, $NaBO_2$, $Na_2B_4O_7$, $KB_5O_8$, $Ca(BO_2)_2$, $Zn_2B_6O_{11}$ and $Zn(BO_2)_2$.

3. A thermoplastic molding composition as claimed in claim 1, wherein component B is a compound which on cooling turns from a molten state into an amorphous, glassy state.

* * * * *